US009324146B2

(12) United States Patent  
Olczak et al.

(10) Patent No.: US 9,324,146 B2  
(45) Date of Patent: Apr. 26, 2016

(54) PHOTOMETRIC AND RADIOMETRIC CALIBRATION USING OPTICAL FEEDBACK

(71) Applicant: Northwestern University, Evanston, IL (US)

(72) Inventors: Paul J. Olczak, Chicago, IL (US); John E. Tumblin, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 14/741,036

(22) Filed: Jun. 16, 2015

(65) Prior Publication Data  
US 2015/0363931 A1 Dec. 17, 2015

Related U.S. Application Data

(60) Provisional application No. 62/012,772, filed on Jun. 16, 2014.

(51) Int. Cl.  
*H04N 17/00* (2006.01)  
*G06T 7/00* (2006.01)  
(Continued)

(52) U.S. Cl.  
CPC ............ *G06T 7/0018* (2013.01); *G01J 1/0295* (2013.01); *G01J 1/4214* (2013.01); *H04N 17/002* (2013.01); *G06T 2207/10016* (2013.01); *G06T 2207/10144* (2013.01)

(58) Field of Classification Search  
CPC ..... H04N 17/00; H04N 17/002; H04N 17/02; H04N 17/004; H04N 17/04; H04N 17/045; G09G 2320/0693; G06T 7/0018  
USPC ................. 348/175, 180, 187, 188, 189, 191; 702/85, 108, 127, 117  
IPC ........................................... H04N 17/00, 17/02  
See application file for complete search history.

(56) References Cited

U.S. PATENT DOCUMENTS 5,818,977 A 10/1998 Tansley  
6,642,499 B1 11/2003 Boni et al.  
(Continued)

FOREIGN PATENT DOCUMENTS

WO 2012155951 11/2012

OTHER PUBLICATIONS

Mann, S., et al., "On Being 'undigital' With Digital Cameras: Extending Dynamic Range By Combining Differently Exposed Pictures," Proceedings of IS&T (1995), 442-448, 7 pages.

(Continued)

*Primary Examiner* — Sherrie Hsia  
(74) *Attorney, Agent, or Firm* — Hanley, Flight & Zimmerman, LLC.

(57) ABSTRACT

Certain examples provide photometric or radiometric calibration using optical feedback. A disclosed example includes dithering between a first display pixel value and a second display pixel value to create a light source from a display. The disclosed example includes capturing the light source using a camera via a plurality of photographs taken by the camera. Each photograph includes a plurality of camera pixels. The disclosed example includes determining a camera response by measuring plurality of camera quantization levels associated with the plurality of camera pixels based on the first display pixel value and the second display pixel value. The disclosed example also includes determining a display response based on the plurality of camera quantization levels. The display response includes a plurality of luminance output values of the display.

20 Claims, 10 Drawing Sheets

(51) Int. Cl.
  *G01J 1/42* (2006.01)
  *G01J 1/02* (2006.01)

(56) References Cited

U.S. PATENT DOCUMENTS

| | | | |
|---|---|---|---|
| 7,038,712 | B1 | 5/2006 | Livingston et al. |
| 7,038,727 | B2 | 5/2006 | Majumder et al. |
| 8,294,958 | B2 | 10/2012 | Paterson et al. |
| 2012/0127324 | A1* | 5/2012 | Dickins .............. H04N 17/04 348/191 |
| 2012/0320042 | A1 | 12/2012 | Green et al. |

OTHER PUBLICATIONS

Debevec, P, et al., "Recovering High Dynamic Range Radiance Maps from Photographs," Proceedings of the 24th Annual Conference on Computer Graphics and Interactive Techniques, SIGGRAPH '97 (1997), 10 pages.
Robertson, M., et al., "Estimation-Theoretic Approach to Dynamic Range Enhancement Using Multiple Exposures," Journal of Electronic Imaging, vol. 12(2) (2003), 219-228, 10 pages.
Mitsunaga, T. et al., "Radiometric Self Calibration," Computer Vision and Pattern Recognition, 1999, IEEE (1999), 374-380, 7 pages.
Zhou, M. et al., "Visual Echo Cancellation in a Projector-Camera-Whiteboard System," Image Processing, 2004, IEEE, 2004 International Conference on Image Processing (2004), 2885-2888, 4 pages.
Adams, A. et al., "The Frankencamera: An Experimental Platform for Computational Photography," ACM Trans. Grap., vol. 29(4) (2010), 12 pages.
Akyuz A.O. et al., "A Reality Check for Radiometric Camera Response Recovery Algorithms," Computer. Graph., vol. 37(7) (2013), 935-943, 3 pages.
Badano, A. et al., "Noise in Flat-panel Displays with Subpixel Structure," Medial Physics, vol. 31(4) (2004), 715-723, 2 pages.
Banterle, F. et al., Advanced High Dynamic Range Imaging: Theory and Practice, AK Peters (CRC Press), Natick, MA, USA (2011).
Blume H.R., et al., "Characterization of High-Resolution Liquid Crystal Displays for Medical Images," Proceedings of SPIE, vol. 4295 (2001), 248-253, 6 pages.
Chakrabarti, A. et al., "An Empirical Camera Model for Internet Color Vision," British Machine Vision Conference (2009), 1-11, 11 pages.
Fan, J. "Development of Image Display-Specific Evaluation and Optimization Schemes," PhD thesis, University of Arizona, (2006) 150 pages.
Gallegos, D., "Label-Free Biodetection Using a Smartphone," Lab on a Chip, vol. 13(11) (2013), 2124-2132, 4 pages.
Grossberg, M.D., "What is the Space of Camera Response Functions?" IEEE Conference on Computer Vision and Pattern Recognition (2003), 8 pages.
Grundmann, M., Post-processing Approach for Radiometric Self-Calibration of Video, 2013 IEEE International Conference on Computational Photography (2013), 1-9, 2 pages.
Isikman, S. O. et al., "Lens-free Computational Microscopy Tools for Cell and Tissue Imaging at the Point-of-Care and in Low-Resource Settings," Analytical Cellular Pathology, vol. 35(4) (2012), 27 pages.
Lin, H. et al., Revisiting Radiometric Calibration for Color Computer Vision, Computer Vision (ICCV) (2011), 8 pages.
Martin, S., "Characterization of a High-Quality Monochrome AM-LCD Monitor for Digital Radiology," Medical Imaging, vol. 4681 (2002).
Pamplona, V.F., "NETRA: Interactive Display for Estimating Refractive Errors and Focal Range," ACM Trans. Graph., vol. 29(4) (2010), 8 pages.
Poynton, C.A., A Technical Introduction to Digital Video, John Wiley & Sons, Inc. New York, NY, USA (1996).
Roehrig, H. et al., "The Liquid Crystal Display (LCD) for Medical Imaging in Comparison with the Cathode Ray Tube Display (CRT)," Penetrating Radiation Systems and Applications IV, SPIE, vol. 4786 (2002), 2 pages.
Sharma, G., "LCDs Versus CRTs-Color-Calibration and Gamut Considerations," Proceedings of the IEEE, vol. 90(4) (2002), 2 pages.
Trussell, H. et al., "Calibration of Color CRT Monitors," Proceedings of the Seventh Workshop on Multi-dimensional Signal Processing (1991), 8:9, 3 pages.
Ulichney, R., Digital Halftoning, MIT Press, Cambridge, MA (1987).
Wei, Q. et al., "Detection and Spatial Mapping of Mercury Contamination in Water Samples Using a Smart-Phone," ACS Nano, vol. 8(2) (2014), 1121-1129, 9 pages.
Woodham, R.J., "Photometric Method for Determining Surface Orientation from Multiple Images," Optical Engineering, vol. 19 (1980), 139-144, 6 pages.
Yamazaki, A. et al., "Image Quality Characteristics of Handheld Display Devices for Medical Imaging," PloS ONE, vol. 8(11) (2013), 1-11, 11 pages.

* cited by examiner

PHOTOMETRIC AND RADIOMETRIC CALIBRATION USING OPTICAL FEEDBACK

RELATED APPLICATIONS

This patent claims the benefit under 35 U.S.C. §119(e) to U.S. Provisional Patent Application No. 62/012,772, filed on Jun. 16, 2014, which is hereby incorporated by reference in its entirety.

FIELD OF THE DISCLOSURE

This disclosure relates generally to photometric and radiometric calibration, and, more particularly, to photometric and radiometric calibration using optical feedback.

BACKGROUND

Photometric or radiometric calibration involves quantification of light levels (e.g., visible electromagnetic energy (photometric) or emitted energy at any and all wavelengths (radiometric)) required to output a digital pixel value. Such calibration is typically performed using a manual process in which a sequence of photographs of a static scene is taken by a camera set at different exposures, or shutter times. Changes in exposure values provide known luminance ratios between corresponding pixels in the resulting images. A polynomial model fits the resulting data based on, for example, an expected curve or a least squares fitting to obtain the camera's photometric or radiometric response curve (e.g., a photometric response). Such calibration methods rely on assumptions regarding the camera to find a best fit curve; are limited by finite restrictions of shutter control of the camera, modest numbers of light measurement (e.g., typically only few hundred), and curve smoothness assumptions; and often require specialized laboratory equipment.

Figure 1:
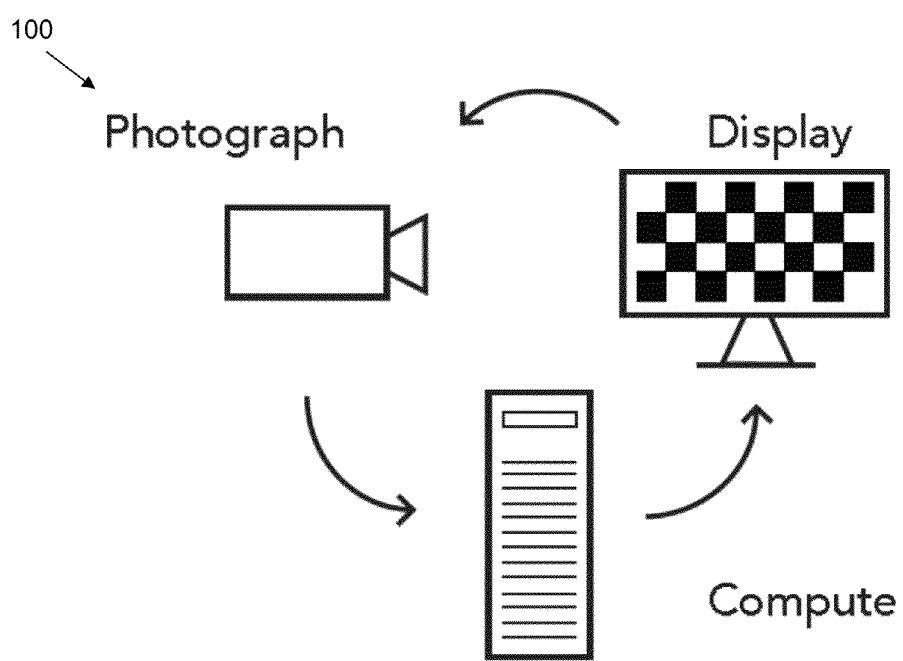
FIG. 1 illustrates an example assembly for implementing the methods and systems disclosed herein.

The following detailed description of certain embodiments of the present invention will be better understood when read in conjunction with the appended drawings. For the purpose of illustrating the invention, certain embodiments are shown in the drawings. It should be understood, however, that the present invention is not limited to the arrangements and instrumentality shown in the attached drawings.

SUMMARY

An example method disclosed herein for calibrating a camera and a display includes dithering between a first display pixel value and a second display pixel value to create a light source from the display. The example method includes capturing the light source using the camera via a plurality of photographs taken by the camera. Each photograph includes a plurality of camera pixels. The example method includes determining a camera response by measuring plurality of camera quantization levels associated with the plurality of camera pixels based on the first display pixel value and the second display pixel value. The example method includes determining a display response based on the plurality of camera quantization levels. The display response includes a plurality of luminance output values of the display.

An example system disclosed herein includes a display to present a first pattern associated with a first display pixel value and a second pattern associated with a second display pixel value to create a light source from the display. The example system includes a camera to capture the light source via a plurality of photographs. Each photograph includes a plurality of camera pixels. The example system also includes a processor to determine a camera response by measuring plurality of camera quantization levels associated with the plurality of camera pixels based on the first display pixel value and the second display pixel value. In the example system, the processor is to determine a display response based on the plurality of camera quantization levels. The display response includes a plurality of luminance output values of the display.

Also disclosed herein is a machine readable storage disk or device including instructions, which when executed, cause a machine to dither between a first display pixel value and a second display pixel value to create a light source from a display. The instructions cause the machine to capture the light source via a plurality of photographs taken by a camera. Each photograph includes a plurality of camera pixels. The instructions cause the machine to determine a camera response by measuring plurality of camera quantization levels associated with the plurality of camera pixels based on the first display pixel value and the second display pixel value. The instructions cause the machine to determine a display response based on the plurality of camera quantization levels. The display response includes a plurality of luminance output values of the display.

DETAILED DESCRIPTION

Efforts to extend photographic capabilities of a digital camera, such as a camera associated with a smartphone, include manual calibration involving analysis of a limited sequence of photographs captured with specialized laboratory equipment or attachment of external devices, such as microscopic and spectrographic devices, to the camera. Such known methods are restricted in that they often rely on assumptions regarding curve fits and/or camera characteristics, provide limited samples, fail to address errors and noise, and are expensive and/or time-consuming to implement.

Certain example methods and systems disclosed herein use a multi-megapixel camera and a digital device (e.g., a tablet, a laptop computer, and/or other portable computing device) having a high-resolution display to calibrate the camera and the display. In the examples disclosed herein, the camera is used as an array of calibrated light meters and the display is used as a light source for capturing high resolution image data that can be used in fields such as optical metrology, medical imaging and diagnostics, and art conservation. In particular, the example methods and systems disclosed herein generate calibration tables for the camera and the display that provide for the conversion of a digital pixel value associated with each device to a span or an input range of light power outputs (e.g., an amount or range of light that results in the digital value). The conversion tables disclosed herein can be used to calibrate the camera and/or the display to, for example, compare changes in objects or scenes photographed by each device over time. Calibration of the camera, for example, provides camera manufacturers and users with an understanding of the capabilities of the camera sensor as the sensor responds to exposure to light. Obtaining accurate measurements of the camera response through calibration allows for increased precision in camera manufacturing. Measurements of a span or range of light associated with pixels of a photograph taken by a precisely calibrated camera can be used to quantitatively and accurately detect, for example, contrast changes beyond that visible to the human eye.

As shown in the example assembly 100 of FIG. 1, a computer-controlled digital camera is aimed at a digital display. A software application controls the display of patterns on the display and provides for the camera to take photographs of the patterns. In certain embodiments, the software uses an algorithm to find light quantization levels for the camera and the display, thereby providing for self-contained calibration of the camera and the device (e.g., calibration without the need for equipment other than the camera and the display).

In certain embodiments, a stationary camera is aimed at a stationary display in a dark or dimly lit room. The camera takes defocused images of the display so that each camera pixel merges light from a plurality of display pixels to create a uniform light source. Certain embodiments provide for patterns to be displayed on the display and captured by the camera for a pre-determined period of time (e.g., 10 to 15 minutes).

Certain embodiments provide for normalization of display luminance measurements (e.g., 1.0 for the display maximum) and for normalization of measures of radiance for each color channel of the camera. Certain embodiments determine each grayscale pixel value's output (e.g., R (red)=G (green)=B (blue)) in luminance normalized to a display maximum.

Certain embodiments determine an exposure (e.g., shutter time*normalized display luminance) boundary where each pixel value changes and where pixel values q and q−1 are equally probable as estimated from pixel-value plots (e.g., histograms) for proximate display light values.

Certain embodiments provide for programmable control of both the camera and the display. Contrary to most known calibration methods, examples disclosed herein do not map one light amount to one digital value with individual measurements, but instead summarize the values of thousands of camera pixels that each view thousands of individually controlled display pixels. The examples disclosed herein provide for increased precision in mapping between the digital values and the light amounts. Certain embodiments use a Gaussian model of system noise to estimate light amounts with precision greater than either of the display or the camera quantizers. Although random noise from known and/or unknown sources is typically present in photographs captured by the camera and results in variations of the digital output levels for the camera, an average of the digital pixel values for a plurality of identically illuminated pixel sensors can be used as an approximation of an amount of light in a scene without sacrificing precision of the measurement.

Example methods and systems disclosed herein provide for photometric and radiometric calibration using optical feedback. Calibration describes the mapping from numbers (e.g., digital values) to amounts of light visible to human viewers measured in photometric units. For displays, such numbers are referred to as digital drive levels $D^{disp}$. The light caused by the digital drive levels is measured as luminance $p^{disp}$, in luminance units $$\frac{cd}{m^2}.$$

The luminance $p^{disp}$ is normalized to, for example, 1.0 at the display's maximum output. Photometric display calibration examples disclosed herein determine a table of values $F^{disp}$, which converts digital drive level $D^{disp}$ to its light power output $p^{disp}$:

$$p^{disp} = F^{disp}(D^{disp}) \quad\quad (\text{Eq. 1})$$

Similarly, examples disclosed herein compute a table of values $F^{cam}$ that converts spans of incident light power, or exposure, $e_{in}$, to its digital output level $D^{cam}$:

$$D^{cam} = F^{cam}(e_{in}) \quad\quad (\text{Eq. 2})$$

A reciprocity equation models exposure and is a product of a camera shutter time $\Delta t$ and a scene's luminance $L_s$. This equation shows that a change in $L_s$ and the reciprocal change in $\Delta t$ yields an identical exposure:

$$e_{in} = L_s * \Delta t \quad\quad (\text{Eq. 3})$$

In some examples, if the shutter time doubled and the luminance is halved, then the exposure and, because of Equation (2) referenced above, the camera output remain unchanged.

Some known approaches to calibration include calibrating CRT and LCD displays with the aid of specialized laboratory equipment such as radiometers, light sources within integrating spheres, and oscilloscopes that may not be suitable for portable use. Some known calibration methods have demonstrated that each color channel associated with the camera exhibited constant chromaticity (e.g., a hue and saturation quality of a color regardless of its luminance) for all drive levels. If the R, G, B (red, green, blue) display tables differ, the display will not yield constant chromaticities for all gray levels where $D^{disp} = R = G = B$.

Some known photometric calibration methods determine the camera table $F^{cam}$ simultaneously while merging several photos of a High Dynamic Range (HDR) scene. Some known methods find a best-fitting smooth $F^{cam}$ curve from a small set of values from pixel addresses selected from a series of bracketed photos. Such methods involve a small number of photos taken from a stationary camera to capture the HDR scene.

Figure 2:
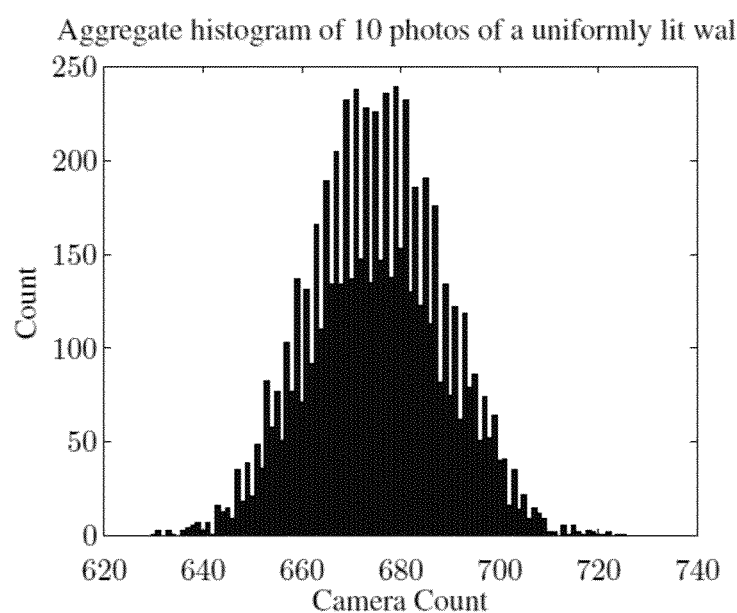
FIG. 2 shows a graph of aggregated camera responses known in the prior art.

In some known calibration methods, a camera's photometric response is determined from the small set of bracketed photos and the resulting data is fit to a polynomial model for the camera's photometric response. Such known methods do not account for the camera's shutter time specifications. Other known methods determine a non-parametric camera response function using a probabilistic formulation and iterative numeric optimization. Such methods may provide for calibration of sensors that lack intrinsically linear responses, but typically rely on only a few samples to determine the camera's response and require curve fitting by iterative computational optimizations. Also, as shown in FIG. 2, camera response histograms plotting pixel counts for a camera often display characteristics of combyness (e.g., a non-smooth smooth response). Known methods typically assume a smooth camera response curve and fail to account for variabilities in the camera response.

Examples disclosed herein generate a camera table $F^{cam}$ for a camera device and a display table $F^{disp}$ for a digital display device. The examples can be used to build the camera table $F^{cam}$ for an M bit camera having drive levels that vary between $0 \leq D^{cam} < 2^M$ and the display table $F^{disp}$ for an N bit camera having drive levels that vary between $0 \leq D^{disp} < 2^N$.

In some examples, to create the camera table $F^{cam}$ and the display table $F^{disp}$, a linear, uniform light source is created by dithering between two display values, $$D_a^{disp} \text{ and } D_b^{disp}.$$

A dither pattern $\psi_k$ and a camera shutter time $\Delta t$ are varied to measure a camera response curve and calibrate the camera. The calibrated camera is used as a light meter to calibrate the display.

In some examples of the methods disclosed herein, one or more assumptions apply. In some examples, radiometric spectra that does not change as time passes is assumed at all drive levels for each color channel in both the camera and the display.

In some examples, it is assumed that display radiances for each drive level will not change over the duration of the implementation of the example methods.

Also, in some examples, based on a high precision of manufacturing of LCD displays, it is assumed that the display will include a uniform display pixel size and luminance.

Also, in some examples, it is assumed that any display flicker period is substantially smaller than the camera shutter time $\Delta t$. In some examples, it is assumed that the camera and the display are positioned in a dark or dimly lit room with minimal inter-reflections.

In some examples, it is assumed that reciprocity in the camera is $\Delta t \in$ $$\left[\frac{1}{1000} \text{ s}, 1 \text{ s}\right].$$

Also, in some examples, it is assumed that any noise is zero mean, additive white Gaussian noise.

As described above, the example methods include dithering between display pixels. Dithering display the pixels provides for control of a linear light source that is used to calibrate the camera. In some examples, the display is divided into squares of $$\psi_{side}^2$$

pixels for each square. In such examples, a dither number $\psi_k$ is used for each square such that $\psi_k$ pixels are assigned a value $$D_a^{disp}$$

and emit a luminance $$p_a^{disp} = A$$

and the remaining $$\psi_{side}^2 - \psi_k$$

pixels have a drive value $$D_b^{disp}$$

and emit a luminance $$p_b^{disp} = B.$$

In some examples where there is a uniform display pixel size and output, then the display's light output is:

$$p_\psi^{disp}(A, B, \psi_k, \psi_{max}) = \frac{\psi_k * A}{\psi_{side}^2} + \frac{(\psi_{side}^2 - \psi_k) * B}{\psi_{side}^2} \quad \text{(Eq. 4)}$$

In such examples, the luminance of the display can be linearly adjusted by choosing the dither value $\phi_k$. Such a display control technique (e.g., two-color ordered dithering) provides for a uniform pattern to the squares. In some examples, the defocused camera lens converts the dither patterns to uniform luminance on every camera sensor pixel. As $$\psi_{side}^2$$

increases, the difference between sequential display luminance decreases, but the camera lens continues to blur the pixels on the display to create a uniform light source. As an example, a 16×16 ordered dither pattern can be used to create 256 equal sized steps in luminance output.

Dithering provides for a quantized, uniform light source to be created from the display using two known display pixel luminance values A, B. In some examples, an upper display luminance $$B = p_{max}^{disp} = F^{disp}(D_{max}^{disp})$$

is set to have a value of 1.0. With respect to the value of A, because a camera typically has a power-of-two camera shutter adjustment, an A value having a maximum value of 0.5B is determined. To find such a value of A, a reference shutter time $\Delta t_{ref}$ is selected that will capture $$B = p_{max}^{disp}$$

at a midrange reference value, $$D_{ref}^{cam}.$$

The reference shutter time $\Delta t_{ref}$ is doubled and the display drive value $$D_a^{disp}$$

that yields $$D^{cam} \leq D_{ref}^{cam}$$

is determined. The display drive value $$D_a^{cam}$$

produces a display luminance A≤0.5B.

In some examples, to find the value of luminance A, a known dither value $\psi_{half}$ that produces a display luminance $$p_\psi^{disp} = 0.5B$$

substituted into the following equation to find A:

$$A = p_a^{disp} = \left(.5 - \frac{\psi_{side}^2 - \psi_{half}}{\psi_{side}^2}\right) * \frac{\psi_{side}^2}{\psi_{half}} \quad \text{(Eq. 5)}$$

The value $\psi_{half}$ is found by searching through dither values using the camera's reciprocity. For example, with respect to the reciprocity equation described by Equation (3) above, if the shutter time $\Delta t_{ref}$ is doubled and the dither value that causes the camera output $$D_{ref}^{cam}$$

is determined, then the dither value $\psi_{half}$ that cause a display luminance of 0.5B can be found.

Some examples herein use a statistical model of noise to find the camera calibration. If a noiseless and distortionless camera photographs a noiseless, uniformly lit display, such a camera will yield a single valued photograph because the incident luminance falls between two camera quantization levels (measured in exposure), $$e_{qi}^{cam} \leq p^{disp} * \Delta t < e_{qi+1}^{cam} (\text{e.g., between } [e_{qi}^{cam}, e_{qi+1}^{cam}]).$$

However, as is known in the art, no camera is truly noiseless. Rather, factors such as photon arrivals, electron shot and thermal noise, reset noise, etc. cause pixel values that diverge randomly from the ideal single value. Instead, as shown in FIG. 3A, a typical camera yields a nearly Gaussian distribution of pixel values that will spread wider with noisier sensors or lower light levels.

Figure 3A:
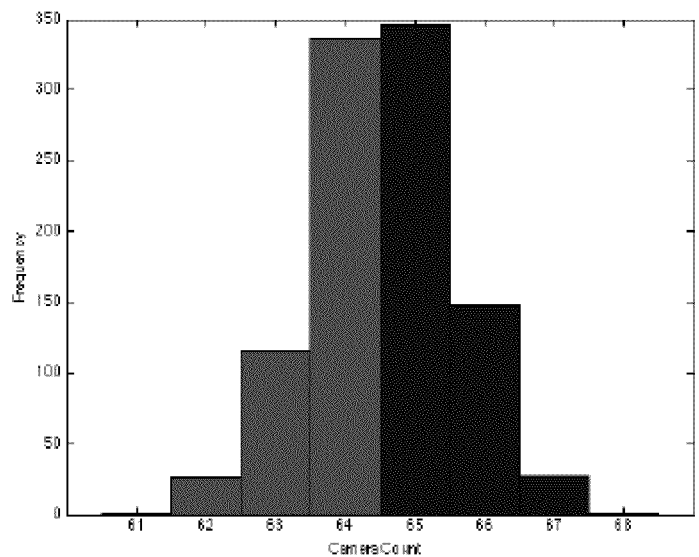
FIGS. 3A-B show example graphs of quantization boundaries for a camera.
Figure 4:
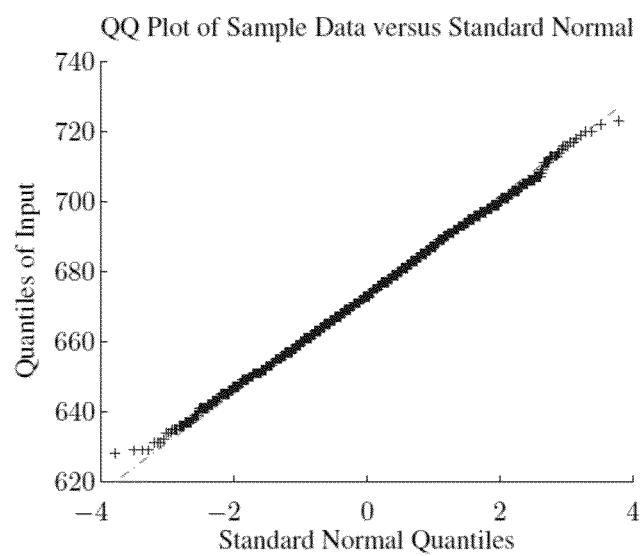
FIG. 4 shows a plot of a normal distribution of camera response data collected using the methods and systems disclosed herein.

As shown in FIG. 3A, the examples disclosed herein generate histograms in which the camera and display systems are described as being normally distributed. As shown in the QQ-Plot (quantile-quantile probability plot) of FIG. 4, the histograms generated using the example disclosed herein closely match the Gaussian normal distribution of data. Thus, in the disclosed examples, the histograms of camera pixel values and the mean and standard deviation of pixel values in a single photo are used to describe camera responses to the dither-controlled light values.

In some examples, camera response histograms such as the histogram shown in FIG. 3A are used to directly or substantially estimate the camera quantization power or level, $$e_{qi}^{cam}.$$

Figure 3B:
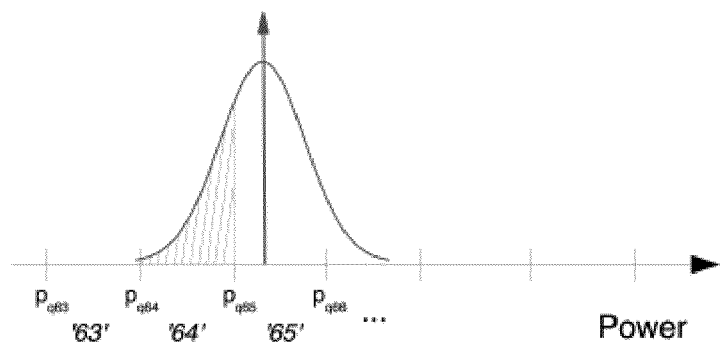

The quantized camera response histograms are associated with the continuous normal distributions formed by display luminance and noise sources. FIG. 3B shows an ideal luminance value of $$p_\psi^{disp}$$

spread by various noise processes and a typical camera response histogram, such as the histogram of FIG. 3A. In some examples, it is assumed that a mean of a continuously distributed luminance input is equivalent to an output luminance of the display, $$p_\psi^{disp},$$

which is photographed by the camera for $\Delta t$ seconds. Also, in some examples, an equation relating to the green shaded area of the continuous luminance input and the green shaded bins (e.g., each of count Bin(i)) in the camera response histogram of FIG. 3A is generated using a cumulative distribution function $\Phi(\cdot)$ and a number of counts in the camera response histogram, $N_{histogram}$:

$$\frac{1}{N_{histogram}} \sum_{i=0}^{i=D_i^{cam}} \text{Bin}(i) = \Phi\left(.5 - \frac{e_{qi}^{cam} - p_\psi^{disp} * \Delta t}{\sigma}\right) \quad \text{(Eq. 6)}$$

In Equation (6), the argument of $\Phi$ is a standardized expression that describes a left handed probability, or area under a normal distribution function $\phi$ from $$[-\infty, e_{qi}^{cam}],$$

if $\sigma$ were known. However, in some examples, $\sigma$ is not known. In such examples, display values proximate to (e.g., surrounding)

$$e_{qi}^{cam}$$

are used to find $$e_{qi}^{cam},$$

such that $$e_{qi}^{cam}$$

is sandwiched between two different display values:

$$p_{qi-}^{disp} * \Delta t_{qi-} < e_{qi}^{cam} < p_{qi+}^{disp} * \Delta t_{qi+}.$$

Figure 5:
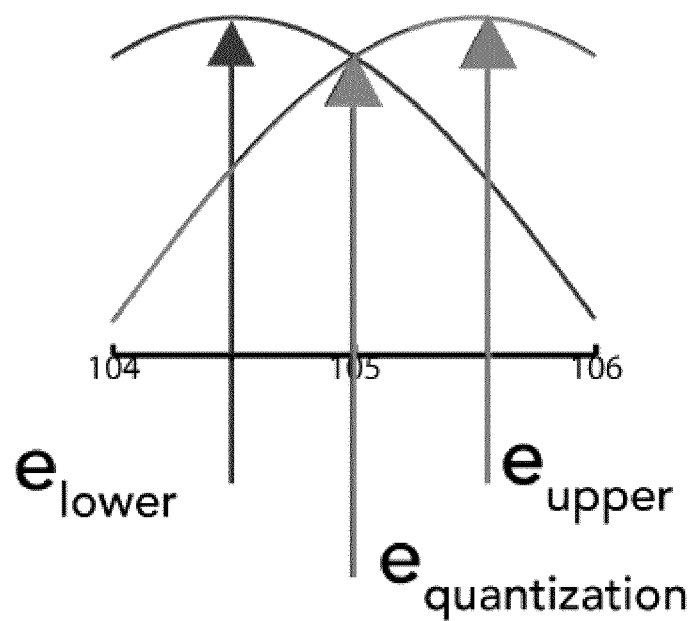
FIG. 5 is an example graph of quantization boundaries for a camera.

Put another way, $e_{lower} < e_{quantization} < e_{upper}$ as illustrated in FIG. 5, which shows a camera quantization power (e.g., a camera quantization or an exposure boundary) $e_{quantization}$ sandwiched by two average display powers, $e_{lower}$ and $e_{upper}$ having average values denoted by arrows. Equation (6) can be solved for unknowns $\sigma$ and $$e_{qi}^{cam}$$

by taking the inverse ($\Phi^{-1}()$) of both sides of Equation (6) and then adding:

$$\frac{e_{qi}^{cam} - p_{qi-}^{disp}}{\sigma} = \Phi^{-1}\left(\frac{1}{N_{histogram}} \sum_{i=0}^{i=qi,left} \text{Bin}(i)\right) \quad \text{(Eq. 7)}$$

$$\frac{e_{qi}^{cam} - p_{qi+}^{disp}}{\sigma} = \Phi^{-1}\left(\frac{1}{N_{histogram}} \sum_{i=0}^{i=qi,right} \text{Bin}(i)\right)$$

To approximate $$e_{qi}^{cam},$$

a local linearity between input exposures $$p_{qi-}^{disp} * \Delta t_{qi-} \text{ and } p_{qi+}^{disp} * \Delta t_{qi+}$$

is assumed and associated camera responses of the input exposures, $$\overline{D_-^{cam}}, \overline{D_+^{cam}},$$

are used to find a weighted average:

$$e_{qi}^{cam} = p_{\psi qi-}^{disp} * \Delta t_{qi-} * \frac{\text{Abs}(\overline{D_+^{cam}} - q_i)}{\text{Abs}(\overline{D_-^{cam}} - q_i) + \text{Abs}(\overline{D_+^{cam}} - q_i)} + \quad \text{(Eq. 8)}$$

$$p_{\psi qi+}^{disp} * \Delta t_{qi+} * \frac{\text{Abs}(\overline{D_-^{cam}} - q_i)}{\text{Abs}(\overline{D_-^{cam}} - q_i) + \text{Abs}(\overline{D_+^{cam}} - q_i)}$$

In the examples disclosed herein, Equation (8) can be used to measure $$e_{qi}^{cam}$$

to create camera calibrations. In some examples, Equation (8) is used instead of Equation (7) to create camera calibrations with less noise.

The examples disclosed above provide for a camera quantization level from two display settings that sandwich the camera quantization level and respective shutter times of the two display settings. Using the above examples, the $$e_{qi}^{cam}$$

value associated with the camera can be found. In some examples, the shutter time is repeatedly doubled and the dithered measurement process is repeated for higher-exposure portions of the camera table, $F^{cam}$. Also, in some examples, the shutter time is repeatedly halved for lower exposure portions of the camera table $F^{cam}$. In some examples, $$e_{qi}^{cam}$$

is sandwiched by trying substantially all possible shutter times $\Delta t$ and dither values $\psi_k$ of the camera and the display to solve for each $e_{qi}^{cam}$ using the closest sandwiching light values.

Before inserting the digital output level $D^{cam}$ and the camera quantization level $$e_{qi}^{cam}$$

as an ordered pair or tuple $$\langle D^{cam}, e_{qi}^{cam} \rangle$$

into the camera table $F^{cam}$, the $$e_{qi}^{cam}$$

value is scaled by a reference shutter time $\Delta_{ref}$ to find a scaled (e.g., a corrected) exposure value:

$$e_{qi,scaled}^{cam} = \frac{e_{qi}^{cam}}{\Delta tref} \quad \text{(Eq. 9)}$$

The example methods for finding $$e_{qi}^{cam} \text{ and } e_{qi,scaled}^{cam}$$

are repeated for each pixel to complete the camera table $F^{cam}$.

Figure 6:
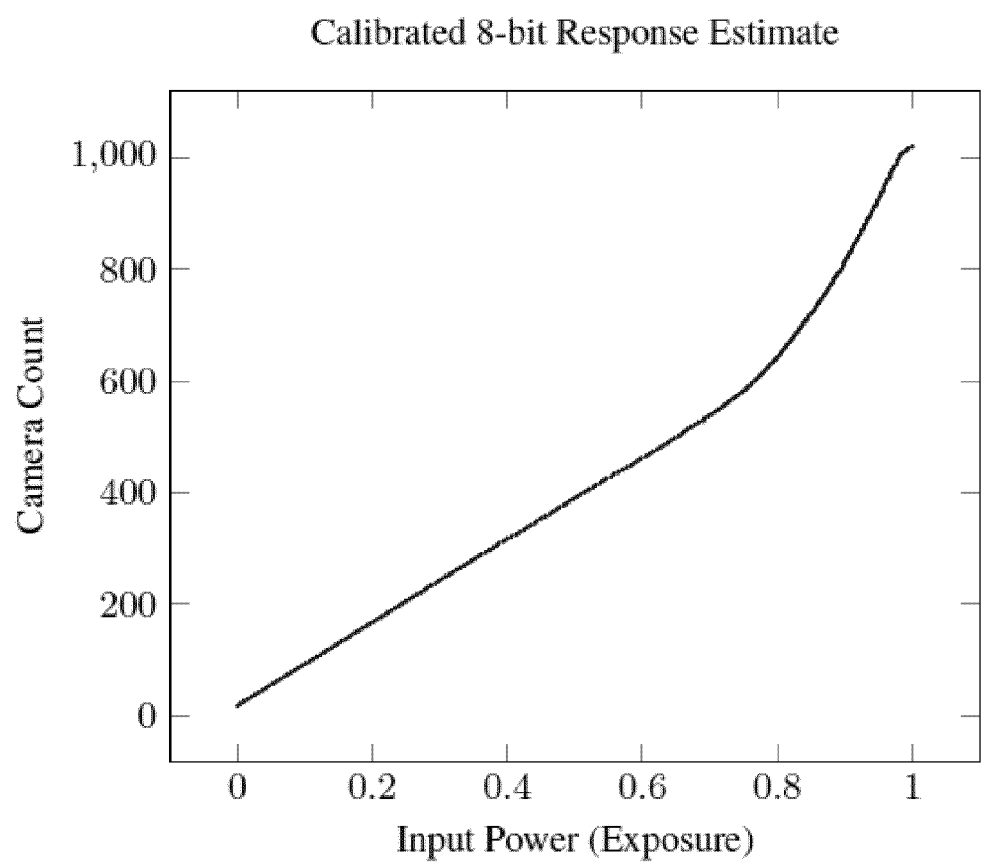
FIG. 6 is an example calibration curve for a camera.

FIG. 6 illustrates an example calibration curve for a red channel of a camera calibrated to 8 bits of resolution using a display on a smartphone as a light source.

Figure 7A:
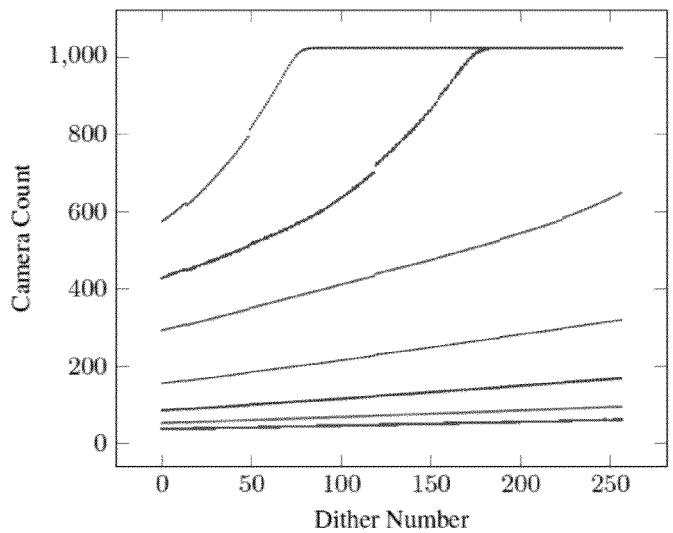
FIGS. 7A-B show graphs of a camera response for different shutter times.
Figure 7B:
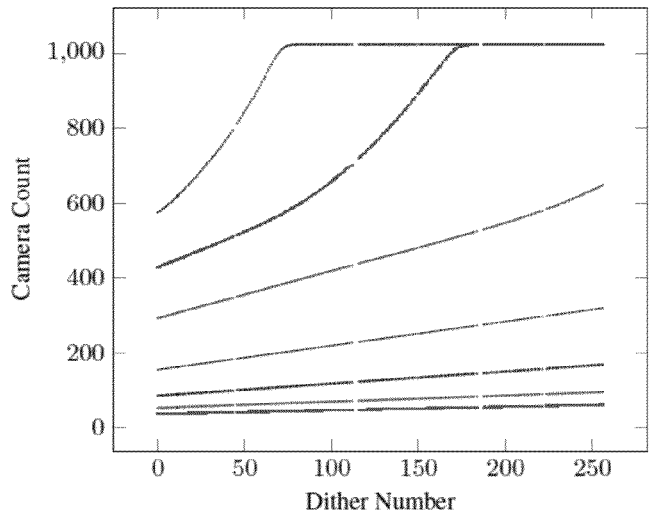

FIGS. 7A-B illustrate example camera responses for a first shutter time value of 37.5 ms and a second shutter time value of 1s sweeping through all dither patterns presented during implementation of the examples disclosed herein. As illustrated in FIG. 7A, some response curves include discontinuities, which illustrates that some pixels on the displays are brighter than others. Contrary to typical assumptions, FIG. 7A illustrates that sets or groups of display pixels are not equivalent. Rather, when switching between groups of display pixels (e.g., stepping dither pattern to dither pattern from digital drive value $$D_a^{disp}$$

to digital drive value $$D_b^{disp}),$$

one group of display pixels may contribute a substantially different amount of light than the other groups, thereby causing the step-like discontinuities in light output versus dither number $\psi_k$ shown in FIG. 7A. Such variations in the pixel brightness can be accounted for by rescaling a dither axis proportional to estimated energy levels, as shown in FIG. 7B. In some examples, short linear portions of the camera response curve (e.g., portions associated with short shutter times) are used to estimate a relative luminance increase produced by each dither pattern. In FIG. 7B, gaps remaining in the corrected camera response curves result from pixel-to-pixel luminance noise that can prevent the display from emitting uniformly spaced luminance powers. FIGS. 7A-B also show further characteristics of the camera response, such as an intrinsic non-linear response of the camera as the camera is driven toward saturation.

In the example methods and systems disclosed herein, the calibrated camera is used to find the display table values not already computed using one or more of the processes described above. Calibrating the display involves an inversion of the camera calibration processes. For example, display luminance values are sandwiched with sequential known camera quantization levels $$e_{qi}^{cam}$$

and $$e_{qi+1}^{cam}$$

to solve for each display luminance value $$p_j^{disp}:$$

$$\frac{\frac{e_{qi}^{cam}}{\Delta t_{qi}} - p_j^{disp}}{\sigma} = \Phi^{-1}\left(\frac{1}{N_{histogram}} \sum_{i=0}^{i=q_i} Bin(i)\right) \quad \text{(Eq. 10)}$$

$$\frac{\frac{e_{qi+1}^{cam}}{\Delta t_{qi+1}} - p_j^{disp}}{\sigma} = \Phi^{-1}\left(\frac{1}{N_{histogram}} \sum_{i=0}^{i=q_{i+1}} Bin(i)\right)$$

The values $$p_j^{disp}$$

and $\sigma$ are solved for by adding the two equations of Equation (10) together. As with the camera table, the value $$p_j^{disp}$$

is rescaled to remain consistent with display table values. A scale factor for the display table is an inverse of Equation (9), or:

$$p_{j,scaled}^{disp} = p_j^{disp} * \Delta t_{ref} \quad \text{(Eq. 11)}$$

Once $$p_j^{disp}$$

is scaled, the luminance value $$p_{j,scaled}^{disp}$$

and the digital drive level $D^{disp}$ are inserted into the display table in the form of a tuple $$\langle D^{disp}, p_{j,scaled}^{disp} \rangle$$

and the process described above is repeated for all unassigned display table entries.

Upon determining the entries for the camera table $F^{cam}$ and the display table $F^{disp}$, the light power outputs $$e_{qi}^{cam}$$

are normalized to ensure the values fall within, for example, the range [0,1] corresponding to normalized value $p^{disp}$ for the display's maximum output.

Figure 8:
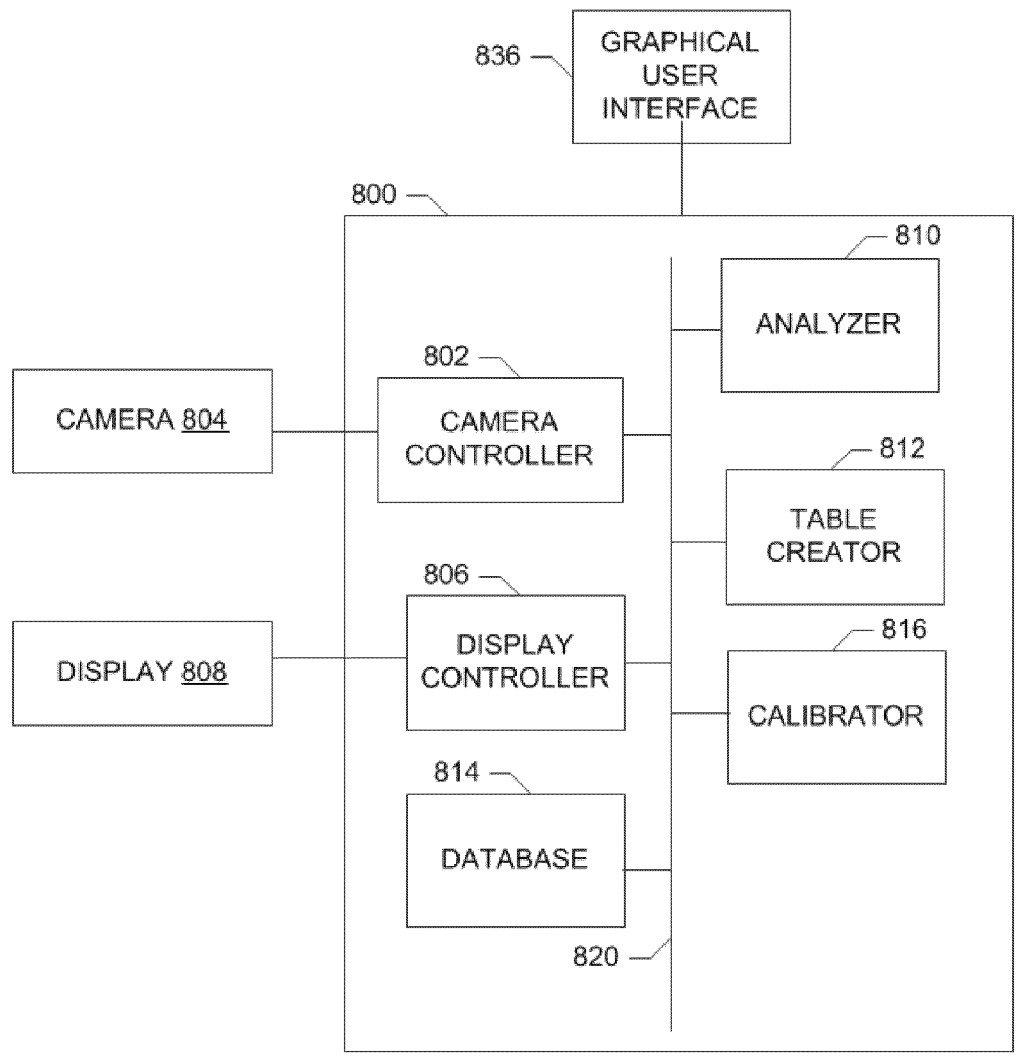
FIG. 8 is a block diagram of an example processing system for the first assembly of FIG. 1.

FIG. 8 is a block diagram of an example processing system 800 for use with a photometric or radiometric calibration assembly such as the example assembly 100 of FIG. 1 for calibrating a camera. The example processing system 800 includes a camera controller 802, which is communicatively coupled to a camera 804 to control operation of the camera 804. In some examples, the camera controller 802 controls a number of photographs taken by the camera, an exposure of the camera (e.g., shutter time), a focus of the camera, etc. The example processing system also includes a display controller 806, which is communicatively coupled to a display 808 to control operation of the display 808. The display controller 806 controls, for example, presentation of one or more patterns by the display 808 for capture by the camera 804 via one or more photographs, dithering of display pixels between a first display value and a second display value to create and control a uniform light source (e.g., a calibration source), and an amount of time the patterns are presented by the display.

The example processing system 800 includes an analyzer 810 to compute a light power or camera quantization level, or an amount of light for each of the digital pixel values output by the camera 804 when photographing the patterns presented on the display 808. In some examples, the analyzer 810 computes the camera quantization levels of the camera 804 using one more algorithms described above (e.g., Equations (7)-(9)) based on a digital values associated with individual pixels that correspond to an amount of light falling on a sensor of the camera 804. The analyzer 810 also calculates the light power outputs corresponding to digital values associated with the display as described above (e.g., Equations (10), (11)). The example analyzer 810 also scales the luminance or light power outputs and normalizes the camera and display values to a maximum of the display luminance output.

The example processing system 800 also includes a table creator 812. The table creator 812 generates a camera table that maps light power or camera quantization levels and corresponding digital values for the camera 804. For example, the table creator 812 creates the camera table including data pairs for the digital value and camera quantization level measured as exposure (e.g., $<D^{cam}, e^{cam}>$) for each pixel output by the camera 804 when photographing the dithered patterns. The table creator 812 also creates a display table that converts digital drive values of the display 808 to corresponding light power output amounts.

The example processing system 800 also includes a database 814 that stores information related to the operation of the example system 800. The database 814 stores operational characteristics and/or settings implemented via the camera controller 802 and/or the display controller 804. For example, the database 814 may store one or more patterns for presentation via the display 808. The database 814 also provides for storage of the camera and/or display tables generated by the table creator 812 as a result of the calculations of the analyzer 810 (e.g., the tables generated for one or more iterations of the example processing system 800).

The example processing system 800 includes a calibrator 816. The calibrator 816 provides an indication of a range of light values (e.g., an amount of light visible to a viewer) for a particular digital value or number associated with a pixel output by the camera 804. For example, a photograph taken by the camera 804 includes individual pixels associated with corresponding digital values representative of an amount of light falling on a camera sensor. The calibrator 816 references the camera table created by the table creator 812 to provide an output that includes a range of light values for a selected digital number associated with a pixel.

The example processing system 800 also includes a user interface such as, for example, a graphical user interface (GUI) 818. An operator or technician interacts with the processing system 800, and thus, the example assembly 100 via the interface 818 to provide, for example, commands related to operation of the camera 806 and/or the display 808, the patterns presented on the display 808, the exposure of the camera 806, the number of photographs taken by the camera 806, the digital value or number of interest for a pixel associated with the camera 806 and/or the display 808 for obtaining the range of light values from the respective camera or display tables via the calibrator 816, etc.

In the example shown, the processing system components 802, 806, 810, 812, 814, 816 are communicatively coupled to other components of the example processing system 800 via communication links 820. The communication links 820 may be any type of wired connection (e.g., a databus, a USB connection, etc.) and/or any type of wireless communication (e.g., radio frequency, infrared, etc.) using any past, present or future communication protocol (e.g., Bluetooth, USB 2.0, USB 3.0, etc.). Also, the components of the example system 800 may be integrated in one device or distributed over two or more devices.

While an example manner of implementing the example assembly 100 of FIG. 1 is illustrated in FIG. 8, one or more of the elements, processes and/or devices illustrated in FIG. 8 may be combined, divided, re-arranged, omitted, eliminated and/or implemented in any other way. Further, the example camera controller 802, display controller 806, analyzer 810, table creator 812, database 814, calibrator 816 and/or, more generally, the example processing system 800 of FIG. 8 may be implemented by hardware, software, firmware and/or any combination of hardware, software and/or firmware. Thus, for example, any of the example camera controller 802, display controller 806, analyzer 810, table creator 812, database 814, calibrator 816 and/or, more generally, the example processing system 800 of FIG. 8 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, camera controller 802, display controller 806, analyzer 810, table creator 812, database 814, calibrator 816 is/are hereby expressly defined to include a tangible computer readable storage device or storage disk such as a memory, a digital versatile disk (DVD), a compact disk (CD), a Blu-ray disk, etc. storing the software and/or firmware. Further still, the example processing system 800 of FIG. 8 may include one or more elements, processes and/or devices in addition to, or instead of, those illustrated in FIG. 8, and/or may include more than one of any or all of the illustrated elements, processes and devices.

Figure 9:
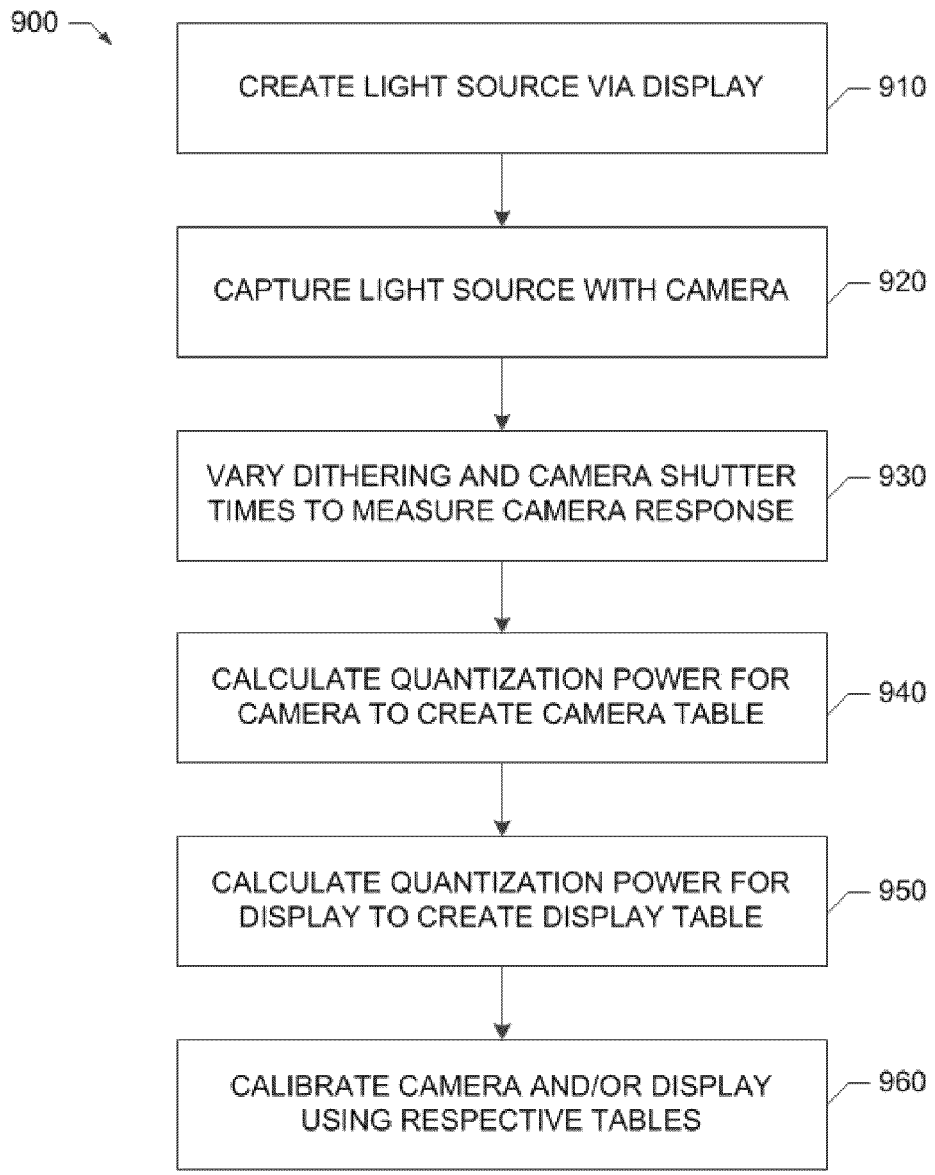
FIG. 9 is a flow diagram of an example method that can be used to implement the examples disclosed herein.

A flowchart representative of example machine readable instructions for implementing the example assembly 100 of FIG. 1 and/or the example processing system of FIG. 8 is shown in FIG. 9. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example assembly 100 of FIG. 1 and/or the example processing system of FIG. 8 may alternatively be used. For example, the order of execution of the blocks may be changed, and/or some of the blocks described may be changed, eliminated, or combined.

As mentioned above, the example processes of FIG. 9, may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended FIG. 9 is an example method 900 in which the examples disclosed herein may be implemented. The method of FIG. 9 begins at block 910 by creating a light source by dithering between two known display pixel luminance values associated with a display (e.g., the display 808 of FIG. 8). The dithering can include presenting one or more pattern(s), which can include pattern(s) of a plurality of squares displayed via the display 808. In the example method 900, dithering the display pixels includes selecting a dither number and assigning display pixels digital drive values and luminance values A, B within each square in the pattern(s). In some examples, the display pixel luminance values are selected using one or more of the equations described above (e.g., Equations (4), (5)).

The example method 900 proceeds to block 920, which includes capturing the light emitted via the display during presentation of the pattern(s). At block 920, the light is captured using a camera (e.g., the camera 804 of FIG. 8) to photograph the pattern(s) presented on the display. In some examples, the camera photographs the pattern(s) for a predefined duration of time to obtain one or more photographs. The camera has one or more sensors such that a lens of the camera converts the dither pattern(s) to an amount of light captured by each pixel of the camera sensor. In some examples, the camera is defocused such that each camera pixel measures many (e.g., hundreds, thousands) of pixels on the display. In some examples, the camera is aimed at a center of the display. Also, in some examples, the camera is operated in a dark or dimly lit room.

At block 930, the example method 900 includes varying the dithering and the camera shutter time to measure a camera response when taking photographs as described at block 920. In taking the photographs, the energy from the display (e.g., the luminance or light output when displaying the dithered pattern) is quantized by sensor(s) of the camera as light falls on the sensor(s). The sensor response for a photograph can be represented by a histogram (e.g., FIG. 3A) that represents pixel counts for each digital value of the camera (e.g., a bin of the histogram). The example method 900 uses sets of histograms to estimate individual quantization boundaries (e.g., FIG. 5) for the camera counts plotted in the histograms.

At block 940, the example method 900 includes calculating light power outputs where camera pixel values change (e.g., a camera quantization boundary) for the camera for each pixel value to create a camera calibration table. The camera quantization boundaries are calculated using, for example, two known display light value outputs. In some examples, a camera quantization power can be found based on two display power values that sandwich the camera quantization power or level of interest. For example, as shown in FIG. 5, a camera quantization power can be sandwiched or bracketed by two known display powers (e.g., average values of the display power values). The equations described above (e.g., Equations (7)-(9)) can be used to find the value of the camera quantization power based on the two display powers that sandwich the camera quantization power and to scale and normalize the resulting values. In some examples, the calculations are performed by the analyzer 810 of FIG. 8.

An amount or a range of light power output for a pixel count is stored in a table with its associated digital drive value to provide for a mapping of digital drive values to camera quantization power. Based on the values calculated by the analyzer 810, the example method 900 creates a table for converting digital numbers to light amounts for the camera. In the example method 900, the camera table can be created by the table creator 812 of FIG. 8.

Because of random noise that may be included in the photographs taken by the camera at block 920, different digital values may be associated with each photograph of a pattern. In some examples of the example method 900, at block 940 the analyzer 810 calculates an average amount of light associated with a pixel for a scene (e.g., the pattern(s)).

Also, in some examples, the histogram created at block 920 is not uniform or smooth, but includes variations in camera response. As a result, the camera response curve generated from the histogram created at block 920 can include variabilities in light values associated with the digital numbers computed at block 940. For example, a range of light values that are associated with a first pixel number can be twice as large as a range of light values that are associated with a second pixel number. Thus, whereas previously known methods may have assumed a smooth camera response curve, accounting for variabilities in the camera response provides for substantially greater precision in measuring changes of light between pixels using the conversion tables generated via the example systems and methods disclosed herein.

The example method 900 also provides for the creation of a display table that can be used to map digital drive values to display quantization powers. At block 950, the example method 900 includes calculating light power outputs for the display (e.g., those light power outputs that are not known) to create a display table. In the example method 900, the camera serves as a light meter for the display in that the display quantization power levels are calculated using the camera quantization power levels computed at block 940 (e.g. by the analyzer 810) using one or more of the equations described above (e.g., Equations (10) and (11)). The power levels for the display are inserted into display a table created by the table creator 812 of FIG. 8.

At block 960, the example method 900 includes calibrating the camera and/or display using the respective camera and display tables generated at blocks 940 and 950. As described above, the camera and display tables provide for the conversion of a digital value (e.g., a number) to an amount of light visible to a human viewer. In the example method 900, the respective camera and/or display tables are used to determine an amount or a range of an amount of light that resulted in a certain digital pixel output by the camera and/or the display. For example, when a photograph is taken with the camera, the result includes an array, or grid of digital values or numbers for each pixel. At block 960, the example method 900 includes referencing the digital value in the camera table created at block 940 to determine the range of light values that are associated with the digital number.

For example, using the camera table, the calibrator 816 of FIG. 8 determines that an amount of light (e.g., energy) resulting in a certain pixel output by the camera includes a first value (e.g., a minimum amount of light that causes the digital value associated with the pixel) and a second value (e.g., a maximum amount of light that causes the digital drive associated with the pixel). In such a manner, the example method 900 provides for a conversion of digital drive values into pixel light amounts for each pixel. In implementing the example method 900 for two or more pixels (e.g., converting digital numbers to an amount of light for each of the two or more pixels), the example method 900 provides for a mapping that illustrates how amounts of light change between the two or more pixels. For example, a range of light values associated with a first pixel value can be greater than or less than a range of light values associated with a second pixel value. At block 960, the display table created at block 950 can similarly be used as disclosed above with respect to the camera value to calibrate the display.

In practice, the example method 900 measures quantization energy levels for the camera and/or display (e.g., a minimum energy required to cause a certain digital pixel output). Such measurements obtained as a result of the example method 900 can be used to determine an amount of light that is associated with each pixel value, which can be used for a variety of applications. Based on the calibration of a camera using the example method 900, changes in light amounts can be used to detect changes in images captured over time and before such changes may be visible to the human eye. For example, a first photograph of a painting taken at a first time can be compared to a second photograph of the painting taken at a second time later than the first time. Comparing the light power outputs associated with the pixels that resulted in the first photograph and the second photograph provides for the detection of changes between the first and second photographs. Such changes may indicate yellowing of the painting, warping, and/or other effects associated aging of the painting. Similarly, the example method 900 can be used in the field of medicine to detect changes in images of tissues (e.g., skin) that can provide indications of, for example, healing of wounds. The example method 900 can be implemented as part of production of, for example, camera phones to detect discrepancies during manufacturing. Calibrations performed via the example method 900 thus provides for reference measurements of light that can be used to detect changes in light captured by the sensors of the camera.

Figure 10:
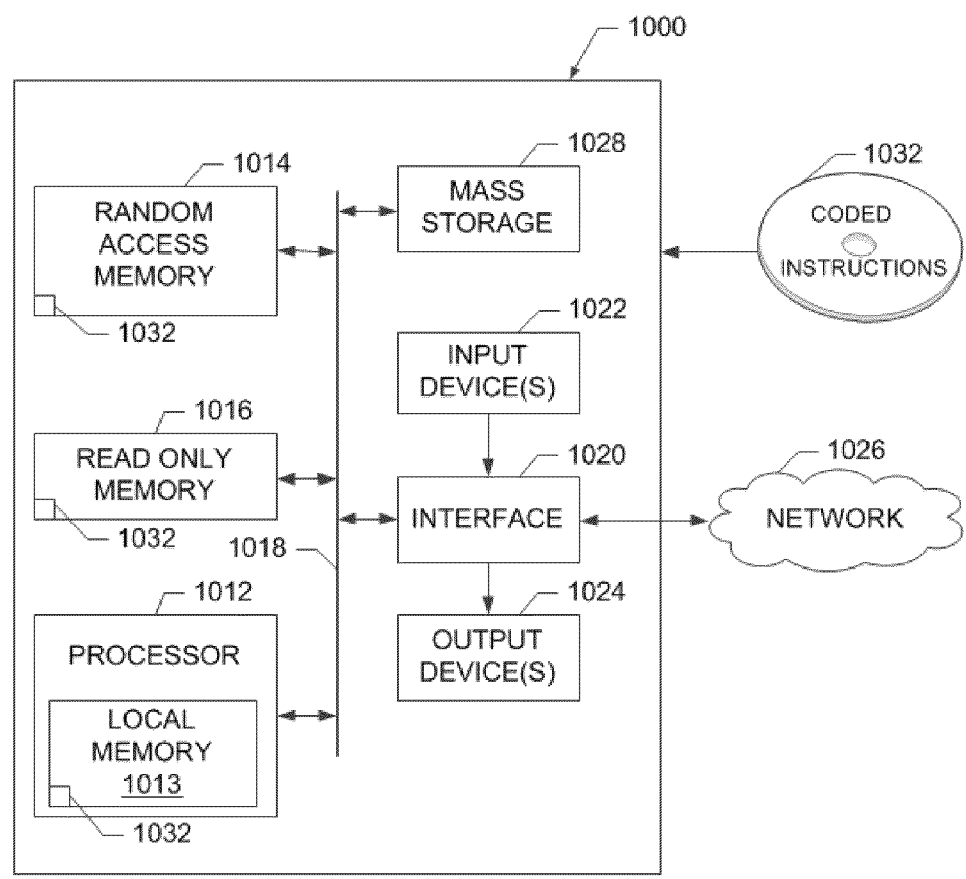
FIG. 10 is a block diagram of an example processor platform capable of executing machine readable instructions to implement the method of FIG. 9.

FIG. 10 is a block diagram of an example processor platform that may be used to execute systems, methods and apparatus described herein. The processor platform 1000 of the instant example includes a processor 1012. For example, the processor 1012 can be implemented by one or more microprocessors or controllers from any desired family or manufacturer. The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a light emitting diode (LED), an organic light emitting diode (OLED), a liquid crystal display, a cathode ray tube display (CRT), a touchscreen, a tactile output device, etc.). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement a local storage device.

The coded instructions 1032 of FIG. 10 may be stored in the mass storage device 1028, in the volatile memory 1014, in the non-volatile memory 1016, and/or on a removable storage medium such as a CD, Blu-Ray, or DVD.

From the foregoing, it will be appreciated that the examples disclosed herein provide for automated calibration of a camera and a display without specialized laboratory equipment and without time-extensive analysis. The example methods and systems disclosed herein provide for calibration tables that can be used to convert a digital values generated by a camera or a display to an amount of light visible by a human viewer, thereby quantizing energy levels required to produce certain digital values. The example methods and systems provide for complete, end-to-end self-calibration of the camera and the display by harnessing the camera and the display to serve as light source and/or meters for one another. The disclosed examples recover camera responses with increased accuracy (e.g., as measured using mean square error analysis) over known prior art methods.

Further, in providing a range or span of luminance values or light amounts associated with a digital value, the example methods and systems provide for high precision results over known calibration methods that typically make assumptions in performing calibrations. Such assumptions ignore details in camera responses and may perpetuate errors in the conversion tables and the calibration. The example methods and systems disclosed herein can be used in a variety of fields to provide high precision image analysis that indicates changes in images before such changes are visible to the human eye without the use of specialized equipment.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method of calibrating a camera and a display, the method comprising:
   dithering between a first display pixel value and a second display pixel value to create a light source from the display;
   capturing the light source using the camera via a plurality of photographs taken by the camera, each photograph comprising a plurality of camera pixels;
   determining a camera response by measuring plurality of camera quantization levels associated with the plurality of camera pixels based on the first display pixel value and the second display pixel value; and
   determining a display response based on the plurality of camera quantization levels, the display response comprising a plurality of luminance output values of the display.

2. The method of claim 1, further comprising:
   generating a camera table comprising a plurality of camera data pairs, each camera data pair comprising a digital camera output level and a camera quantization level;
   generating a display table comprising a plurality of display data pairs, each display data pair comprising a digital display output level and a display luminance output value; and
   performing a conversion between a digital pixel value for at least one of the camera or the display based on the camera table and the display table, respectively.

3. The method of claim 2, wherein the camera quantization level in the camera data pair is associated with a range of camera quantization levels for the digital camera output level.

4. The method of claim 2, further comprising:
   scaling the camera quantization level prior to inserting the camera quantization in the camera table; and
   scaling the display luminance output value prior to inserting the display luminance output value in the display table.

5. The method of claim 1, further comprising varying two or more shutter times of the camera to determine the camera response.

6. The method of claim 1, further comprising normalizing the camera response and the display response based on a maximum luminance output value of the display.

7. The method of claim 1, wherein determining the camera response further comprises:
   measuring a first amount of light associated with the first display pixel value and a second amount of light associated with the second display pixel value; and
   performing a comparison of the first amount of light and the second amount of light.

8. The method of claim 7, further comprising adjusting for a variation between the first amount of light and the second amount of light based on the comparison.

9. A system comprising:
   a display to present a first pattern associated with a first display pixel value and a second pattern associated with a second display pixel value to create a light source from the display;
   a camera to capture the light source via a plurality of photographs, each photograph comprising a plurality of camera pixels; and
   a processor to:
     determine a camera response by measuring plurality of camera quantization levels associated with the plurality of camera pixels based on the first display pixel value and the second display pixel value; and
     determine a display response based on the plurality of camera quantization levels, the display response comprising a plurality of luminance output values of the display.

10. The system of claim 9, wherein the processor is to:
    generate a camera table comprising a plurality of camera data pairs, each camera data pair comprising a digital camera output level and a camera quantization level;
    generate a display table comprising a plurality of display data pairs, each display data pair comprising a digital display output level and a display luminance output value; and
    perform a conversion between a digital pixel value for at least one of the camera or the display based on the camera table and the display table, respectively.

11. The system of claim 10, wherein the camera quantization level in the camera data pair is associated with a range of camera quantization levels for the digital camera output level.

12. The system of claim 10, wherein the processor is to scale the camera quantization level prior to inserting the camera quantization in the camera table and scale the display luminance output value prior to inserting the display luminance output value in the display table.

13. The system of claim 9, wherein the processor is to vary two or more shutter times of the camera to determine the camera response.

14. The system of claim 9, wherein the processor is to normalize the camera response and the display response based on a maximum luminance output value of the display.

15. A machine readable storage disk or device comprising instructions, which when executed, cause a machine to:
    dither between a first display pixel value and a second display pixel value to create a light source from a display;
    capture the light source via a plurality of photographs taken by a camera, each photograph comprising a plurality of camera pixels;
    determine a camera response by measuring plurality of camera quantization levels associated with the plurality of camera pixels based on the first display pixel value and the second display pixel value; and
    determine a display response based on the plurality of camera quantization levels, the display response comprising a plurality of luminance output values of the display.

16. The machine readable storage disk or device of claim 15, wherein the instructions further cause the machine to:
  generate a camera table comprising a plurality of camera data pairs, each camera data pair comprising a digital camera output level and a camera quantization level;
  generate a display table comprising a plurality of display data pairs, each display data pair comprising a digital display output level and a display luminance output value; and
  perform a conversion between a digital pixel value for at least one of the camera or the display based on the camera table and the display table, respectively.

17. The machine readable storage device or disk of claim 16, wherein the camera quantization level in the camera data pair is associated with a range of camera quantization levels for the digital camera output level.

18. The machine readable storage disk or device of claim 16, wherein the instructions further cause the machine to:
  scale the camera quantization level prior to inserting the camera quantization in the camera table; and
  scale the display luminance output value prior to inserting the display luminance output value in the display table.

19. The machine readable storage disk or device of claim 15, wherein the instructions further cause the machine to vary two or more shutter times of the camera to determine the camera response.

20. The machine readable storage disk or device of claim 15, wherein the instructions further cause the machine to normalize the camera response and the display response based on a maximum luminance output value of the display.

* * * * *